United States Patent [19]

Shaver

[11] 3,772,663

[45] Nov. 13, 1973

[54] STATUS DETECTOR AND MEMORY ARRANGEMENT

[75] Inventor: David M. Shaver, Brockville, Ontario, Canada

[73] Assignee: GTE Automatic Electric Laboratories Incorporated, Northlake, Ill.

[22] Filed: Aug. 31, 1972

[21] Appl. No.: 285,395

[52] U.S. Cl...... 340/174 M, 179/18 AH, 179/18 EB
[51] Int. Cl........................... G11c 5/02, H04m 3/00
[58] Field of Search............................... 340/174 M; 179/18 EB, 18 AH

[56] References Cited

UNITED STATES PATENTS 3,529,092 9/1970 Kenedi........................... 179/18 FA
3,587,070 6/1971 Thomas.......................... 340/174 M

*Primary Examiner*—James W. Moffitt
*Attorney*—K. Mullerheim et al.

[57] ABSTRACT

Used in a stored program telephone switching system using a ring core memory in which word wires are connected at one end to a memory driver and at the other end to a memory switch which have memory input address leads, and a clock pulse input to each driver to actuate it to produce a current ramp. Peripheral units such as line circuits and junctors have relay contacts to indicate their status. The status detector comprises a pulse transformer having its secondary winding in series with an inductor connected at one end to an addressing gate, and at the other end to a lead to the status contacts, the other side of the status contacts being connected to a memory switch; so that when the gate and switch are both addressed and the status contacts path provides continuity the transformer is saturated. The primary of the transformer is connected to a memory driver and a sensing device such as a transformer or resistor, so that when the driver produces a current ramp pulse when the transformer is saturated an output is supplied from the sense device to a read amplifier associated with the ring core memory output.

11 Claims, 3 Drawing Figures

STATUS DETECTOR AND MEMORY ARRANGEMENT

BACKGROUND OF THE INVENTION

1. Field of the Invention

This invention relates to a status detector and memory arrangement, and more particularly to a status detector used in a processor controlled telephone switching system.

2. Description of the Prior Art

A combined status detector and ring core memory arrangement is shown in a U.S. Pat. No. 3,487,173 by R. W. Duthie et al for a Small Exchange Stored Program Switching System; with two ring cores of the memory also used for status detection by connecting wires from the memory drivers through one ring core and then to one side of a plurality of the status contacts of peripheral units, with the other side of the status contacts of a plurality of units connected via a wire to a memory switch. This arrangement is advantageous in that the memory input address unit, the memory drivers, the memory switches, the memory ring cores with their sense windings, and the read amplifiers are all used not only for the normal memory, but also for status detection. However the arrangement has some difficulties such as being very sensitive to electromechanical noise originating in the network so that false outputs may be produced from the cores regardless of the state of the status contacts; being limited by cable capacitance on the status leads to the network which may permit sufficient current to flow during the current ramp pulse from the memory driver to produce an output from the core; and having high impedance.

SUMMARY OF THE INVENTION

The object of this invention is to provide a status detector which has high noise immunity, and may be designed to handle the expected cable capacitance to the status contacts.

According to the invention the status detector, which is used in combination with the memory arrangement, comprises a plurality of pulse transformers, each having a secondary winding in series with an inductor connected to a memory addressing gate and to one side of the status contacts of a plurality of peripheral units, with memory switches connected to the other side of the status contacts of a plurality of peripheral units; with the primary of the transformer connected to a memory driver which supplies a current ramp pulse in response to an input clock pulse, and an output sensing device coupled to the primary winding. In operation the memory input address selects a combination of an addressing gate and memory switch to select the status contacts of one peripheral unit, and if the contacts therein are closed current flow through the secondary winding of the transformer saturates it, whereas if the status contacts are open current only flows sufficient to charge the cable capacitance and the transformer is not saturated at the time of the clock pulse. When the clock pulse enables the driver to produce a current ramp pulse in the primary of the transformer, if it has been saturated, an output pulse is produced in the detecting device.

CROSS-REFERENCES TO RELATED APPLICATIONS

This invention is related to the Small Exchange Stored Program Switching System by R. W. Duthie and R. M. Thomas disclosed in U.S. Pat. No. 3,487,173 issued Dec. 30, 1969. The memory arrangement of the system, and particularly the storage readout circuits for reading from temporary memory stores is disclosed in U.S. Pat. No. 3,587,070 issued June 22, 1971 by R. M. Thomas for a Memory Arrangement Having Both Magnetic-Core and Switching-Device Storage with a Common Address Register. The switching network is disclosed in U.S. Pat. No. 3,624,305 issued Nov. 30, 1971 by G. Verbaas for a Communication Switching Network Hold and Extra Control Conductor Usage. The status detecting arrangement is also shown in FIG. 13 of U.S. Pat. No. 3,678,197 issued July 18, 1972 by R. B. Panter et al, for a Dial Pulse Incoming Trunk and Register Arrangement.

DETAILED DESCRIPTION

Figure 1:
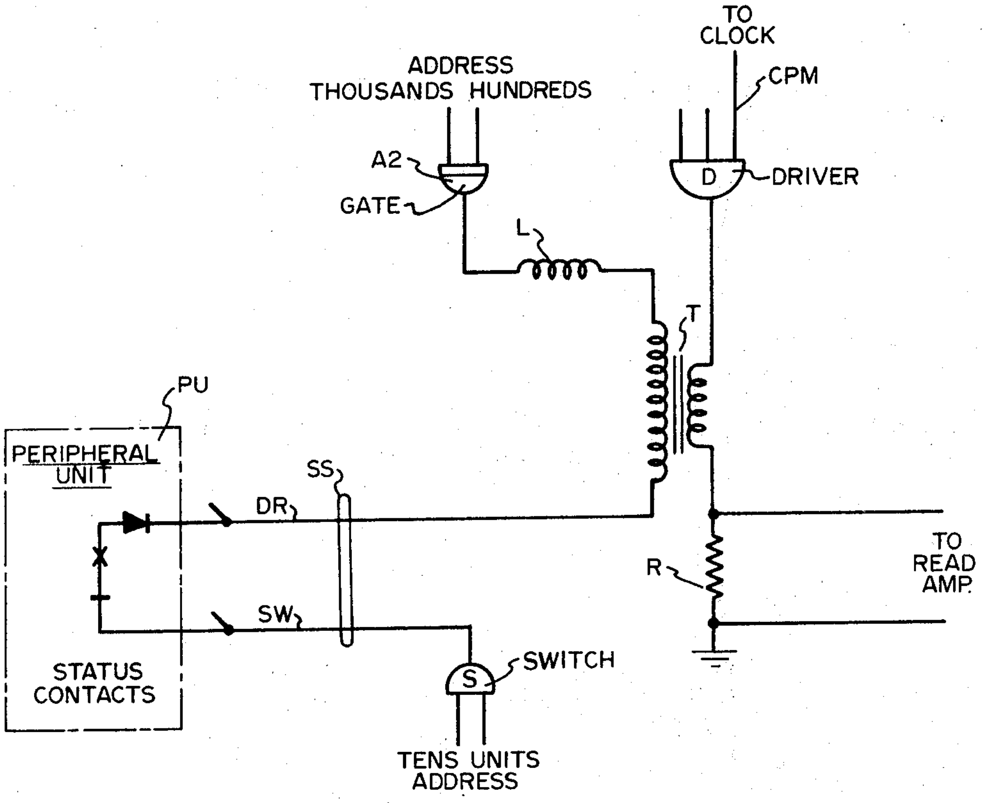
FIG. 1 is a functional block and schematic drawing showing a status detector according to the invention.

The basic status detector circuit is shown in FIG. 1, along with one set of status contacts. As shown in said related applications, the peripheral units comprising line circuits and junctors in the switching network have relay contacts in series with one or more diodes. The contacts for each unit may comprise any combination of make or break contacts, with the set shown comprising one set of make contacts and one set of break contacts in series. The switching network is organized into 100-line groups, with a status lead DR connected to all of the peripheral units within one group, and a lead SW connected to one unit within each group. The group is addressed by an AND gate A2 with the thousands and hundreds digits from a memory input address register, and the lead SW is selected by the output of a memory switch selected by the tens and units digits from the same address register.

The status detector comprises a pulse transformer having a two-to-one turns ratio, with the secondary winding, being the winding with the greatest number of turns, connected in series with an inductor L having an inductance of 470 microhenries, the combination of the inductor and secondary transformer winding being connected in series between the output of gate A2 and the lead DR. The primary winding of the transformer T is connected with one end to the output of a memory driver D, and this winding is also connected in series with a 15-ohm resistor R to ground, to provide an output to a memory read amplifier.

The operation of the pulse detector relies on the ability of the pulse transformer to be saturated at fairly low levels of current, typically 40 – 60 milliamperes. With the status contacts open, that is with the make contacts operated and the break contacts normal, no current flows through the secondary winding of the transformer, regardless of whether the gate A2 and the switch S are selected. When the set of status contacts is selected by the memory address there will be an initial charging current due to the line capacitance which will decay before the driver strobes the primary winding. When in response to the clock pulse on lead CPM the driver turns on to produce a current ramp pulse, there will be a very high impedance through the transformer because of the open secondary winding, so that no current will flow and consequently there will be no output.

The inductor L insures that cable capacitance on the network lines will not be reflected as an alternating current short to the primary and permit current to flow. Also if there happens to be a metallic short between the driver or gate A2 leads and the memory switches, this short will not be recognized as closed contacts. During the time when the driver is off the primary inductance reflected to the secondary presents a high impedance to any electromechanical noise produced in the network. The turns ratio is such that it would take approximately 150 milliamperes in the secondary to produce 70 milliamps of current in the primary and thus produce an output signal.

During the time that the driver is on the inductance L provides a high impedance to the electromechanical noise which has a frequency of about 2 MHz. This insures that open status contacts will not produce an output.

When the status contacts are closed, and the memory input address selects this peripheral unit, current will flow in the secondary of transformer T. The transformer saturates, and when strobed by the driver in response to the pulse on lead CPM there is a low impedance which permits current to flow from the driver, and produces an output pulse across the resistor R.

Thus it can be seen that this status detector provides the advantages of high noise immunity, the address time can be tailored to handle the maximum expected cable capacitance, the current strobe pulse from the driver does not have to pass through the network, and the output impedance is very low.

Figure 2:
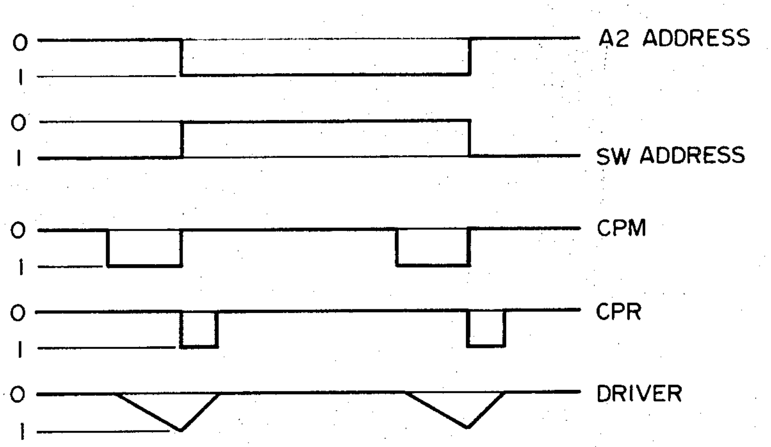
FIG. 2 comprises graphs showing the addressing and clock pulses.

The graphs of FIG. 2 show the logic levels and waveforms. The logic used in this system uses a negative 8-volt potential as the logic "1" or true condition, and ground potential as the logic level "0" or false condition. Thus when the AND gate A2 has both of its inputs true, the output is also true or at −8 volts potential as shown in the upper graph of FIG. 2. The memory switches are arranged with an inverted output so that when both of its inputs are true the output is at near ground potential as shown in the second graph of FIG. 2. The clock pulses produced in this system comprise a pulse CPM having a duration of 3 microseconds and a repetition rate of once every 10 microseconds. Another clock pulse CPR having a duration of 1 microsecond has its leading edge occurring on the trailing edge of the CPM clock pulses. The memory drivers have one clock pulse input for pulse lead CPM, and two addressing inputs. When both of the address inputs are true as indicated by either negative 8-volts or open, the pulse on lead CPM actuates the driver to produce a current ramp of approximately 70 milliamps peak as shown in the lower graph of FIG. 2. The driver shown in FIG. 1 does not use the address inputs and leaves them open circuited.

Typical circuits for the memory drivers, memory switches, and read amplifiers have one embodiment shown in said Duthie et al system patent, and a modified embodiment shown in said Thomas patent for a memory arrangement. In the embodiment of the status detector disclosed herein, the memory switches are preferably designed so that during the 10 microsecond memory cycle in which the memory input address is true, the switch is enabled to provide the ground potential as shown in FIG. 2.

Figure 3:
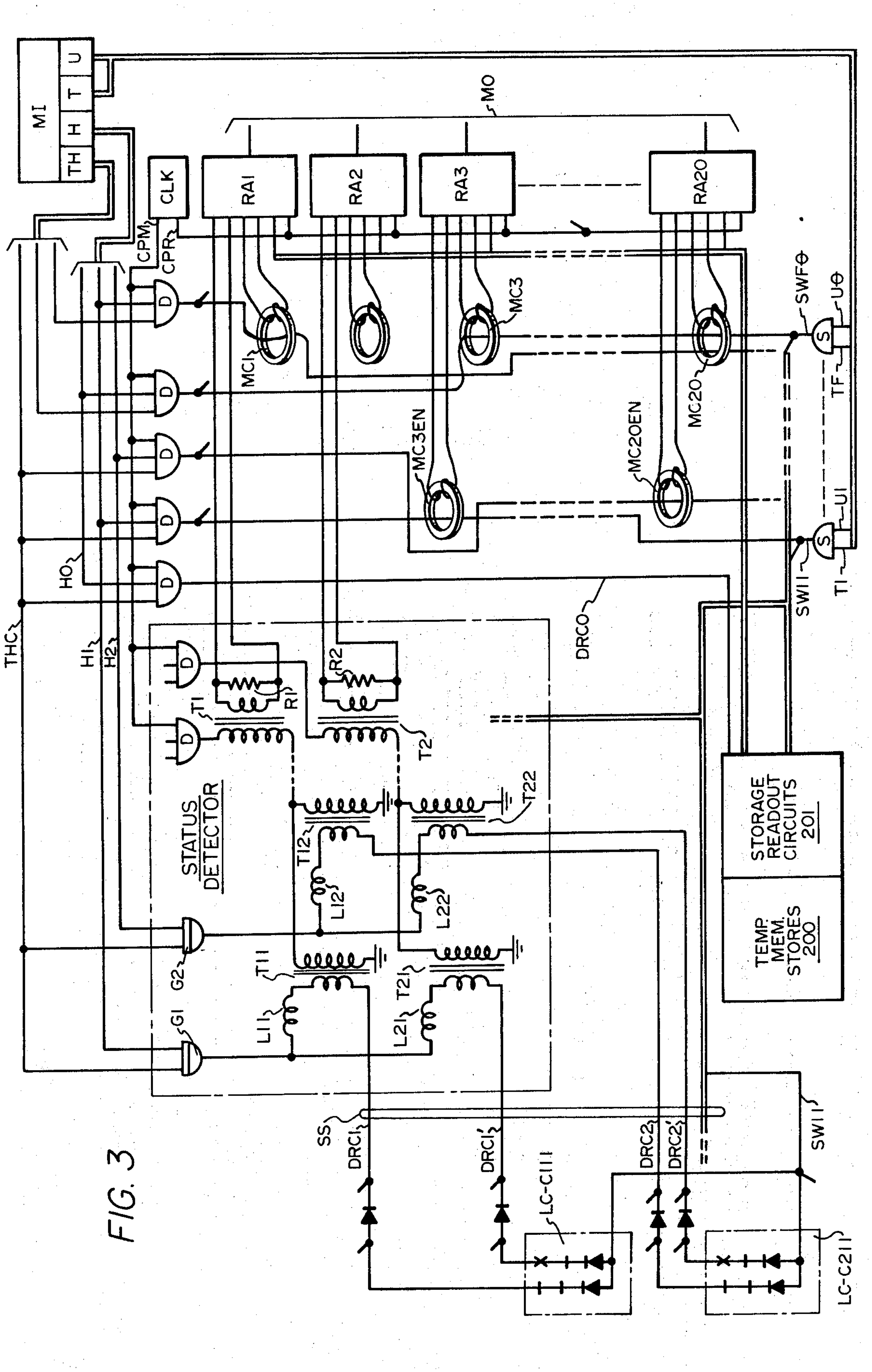
FIG. 3 shows a combination of the status detector with a ring core memory and temporary memory.

FIG. 3 shows a combination of the status detector with the memory of the system. For some of the peripheral unit addresses the status contact arrangement provides two bits, which for the line circuits provides four items of information, e.g. idle, calling for service, busy, and lockout. FIG. 3 shows the status contacts of two of the line circuits, LC-C111 which is in group C1, and LC-C211 which is in group C2. The status cable SS includes two driver leads to each of the peripheral units of the group, for the two bits respectively, and one switch lead to each peripheral unit. For group C1 the status cable driver leads are designated in FIG. 3 as DRC1 and DCR1', and those for group C2 are designated DRC2 and DRC2'. One switch lead SW11 of the cable is shown.

The status detector comprises two pulse transformers for each group for the two bits respectively. FIG. 3 shows transformers T11 and T21 for group C1, and transformers T12 and T22 for group C2, there being corresponding transformers not shown for the other groups. The secondary winding of each transformer is connected in series with an inductor, such as inductor L11 in series with the secondary winding of transformer T11. The inductors L11 and L21 are connected to the output of AND gate G1 for selecting group C1, and the inductors L12 and L22 are connected to the output of gate G2 for selecting group C2, and so forth. FIG. 3 shows two memory drivers in the status detector for the two bits respectively. An alternative embodiment of the output detecting device, as shown in FIG. 3, comprises an output transformer for providing a floating output, namely a transformer T1 for the first bit having its secondary winding connected to an input of read amplifier RA1, and a transformer T2 for the second bit having its secondary winding connected to an input of read amplifier RA2. There are 7.5-ohm resistors R1 and R2 connected across the secondaries of transformers T1 and T2 respectively. The primary windings of the output transformers are connected each from its respective driver to the detection transformers of all of the groups. The output transformers may be identical to the pulse transformers.

The memory input register MI has four output decoding circuits designated TH, H, T and U for the thousands, hundreds, tens and units digits respectively of the address. The thousands and hundreds output leads are connected to memory drivers and also to the selection gates of the status detector; while the tens and units leads are connected to the inputs of memory switches.

The ring core memory is organized into several modules most of which comprise twenty of the ring cores which are of a ferrite material having a linear magnetization characteristic. An equipment number section of the ring core memory for class-of-service information relating to line and trunk circuits comprises eighteen cores MC3EN through MC20EN. The line circuit addresses select both a set of status contacts in conjunction with the status detector, and one word wire of the equipment number section of the memory. Thus for line circuit LC-C111, the thousands digit THC and the hundreds digit H1 select both gate G1 and one of the drivers of the equipment number section, and a tens digit T1 and units digit U1 select a memory switch for both the equipment number section word wire and the contacts of the status detector via lead SW11.

Other modules of the memory comprise 20 cores such as cores MC1 through MC20 of one module shown in FIG. 3. Each of the cores has a sense winding connected to an input of a corresponding one of the twenty read amplifiers RA1-RA20.

The system also includes temporary memory which may be in the form of flip-flops incorporated in various circuits such as registers and senders, represented in FIG. 3 by a block 200. Each of the stores comprising up to twenty flip-flops has an address and may be read via storage readout circuits 201 which are of the type shown in the Thomas patent for a memory arrangement. Most of these temporary memory stores are in the address group CO with a driver enabled by the thousands digit THC and hundreds digit HO. The storage readout circuits also have connections to outputs of memory switches according to their individual addresses.

What is claimed is:

1. A status detection arrangement in combination with a memory arrangement for a system having common control apparatus and a plurality of peripheral units;

said memory arrangement comprising a plurality of ring-shaped magnetic cores with an individual sense winding on each core connected to read amplifier means, word wires selectively threaded through the inside of some cores and outside of others to thereby store information, memory input address means to select one of said word wires, and driver means to supply a current pulse to the selected word wire, to thereby generate an output pulse in the sense winding of each core having the selected wire threaded through it;

said status detection arrangement comprising a status indicating switching means for each of said peripheral units, each of said status indicating switching means being connected to said memory input address means so that each peripheral unit has an individual address, and means responsive to coincidence of selection of the address of an individual peripheral unit having its status indicating switching means providing a continuity path from the memory input address means and actuation of said driver means to produce an output pulse to the read amplifier means;

the improvement wherein said status detecting arrangement includes a pulse transformer having a primary winding and a secondary winding, with the secondary winding connected in series with the status indicating switching means to the memory input address means, and the primary winding connected to a driver means to supply a current pulse, and output means coupling the circuit path through the primary winding to said read amplifier means, the pulse transformer being saturated in response to the memory input address means selecting a peripheral unit having its said status indicating switching means closed to provide a continuity path, so that in response to a current pulse from said driver means with the pulse transformer saturated an output pulse is supplied to said read amplifier means, there being no significant output pulse produced when the pulse transformer does not have current flow through the secondary winding because the selected peripheral unit has an open path through its status indicating switching means.

2. The combination as claimed in claim 1, further including an inductor in series with the secondary winding of the pulse transformer.

3. The combination as claimed in claim 2, wherein said output means comprises a resistor in series with the primary winding, and a connection from the resistor to the read amplifier means.

4. The combination as claimed in claim 2, wherein said output means comprises an output transformer with a primary winding in series with the primary winding of the pulse transformer, and a secondary winding coupled to the read amplifier means.

5. The combination as claimed in claim 4, wherein said output transformer is common to a plurality of pulse transformers, with the primary winding of each pulse transformer connected in multiple to the primary winding of the output transformer;

wherein said memory input address means supplies addresses with a first part and a second part, means coupled from the memory input address means to the secondary windings of the pulse transformers so that each pulse transformer has an individual address first part to select it, each primary winding being connected to a first side of a plurality of peripheral unit status indicating switching means, and switch means having inputs connected to the memory input address means and outputs to switch status leads so that each switch status lead has an individual address second part, each switch status lead being connected to a second side of a plurality of peripheral unit status indicating switching means, each peripheral unit having said first and second sides of its status indicating switching means connected to be selected by its individual address comprising a combination of the first part and second part.

6. The combination as claimed in claim 5, wherein said status indicating switching means comprise relay contacts in series with isolation diode means.

7. The combination as claimed in claim 5, wherein the status detecting arrangement includes a plurality of said output transformers having their secondary windings coupled to different read amplifiers for respective bit positions of a word, with a set of pulse transformers connected to the primary winding of each output transformer, with the memory input address means coupled to the pulse transformers so that an address first part selects a pulse transformer in each set;

and at least some of the peripheral units have a plurality of status indicating switching means with the first side connected individually to secondary windings of the pulse transformers having the same first part address in the respective sets, and the second side connected in common to the switch status lead for the address second part.

8. The combination as claimed in claim 7, wherein the memory input address means is coupled to said memory arrangement so that an address first part selects a first end of a plurality of word wires to effectively couple them to driver means;

and wherein said switch means for the address second part is common to the status detection arrangement and the memory arrangement, with second ends of word wires connected thereto so that a word wire is selected by an individual combination of an address first part and second part.

9. The combination as claimed in claim 8, wherein the connections from the memory input address means to the status detection arrangement and the memory arrangement provides for the addresses of at least some peripheral units to select both its status indicating switching means and a word wire of the memory arrangement, with different bit positions of an output word.

10. A status detecting arrangement for a system having an address register and a plurality of peripheral units with status indicating switching means, with two sets of output leads from the address register for a first part and a second part of addresses respectively;

said status detecting arrangement comprising a pulse transformer having a primary winding and a secondary winding, an inductor in series with the secondary winding, a gate having input connections to the set of leads for the address first part and an output having a first potential when enabled by its address input connections, the series combination of the inductor and primary winding being connected between the output of the gate and a first side of the status indicating switching means of a plurality of peripheral units, a plurality of switch means having input connections to the set of leads for the address second part and each having an output lead having a second potential when enabled by its address input connections, the status indicating switching means of each peripheral unit having a second side connected to the output of one switch means, the pulse transformer being saturated responsive to an address from the address register enabling the gate and switch means of a peripheral unit having a closed path via its status indicating switching means, and not saturated for other addresses;

driver means connected to the primary winding to supply a current pulse when enabled by a clock pulse, and output means coupled to the primary winding circuit path, the pulse transformer having low impedance in the primary winding circuit path when saturated, so that a current pulse from the driver means produces an output pulse at said output means, there being no significant output pulse produced when the pulse transformer is not saturated because it then has high impedance.

11. A status detecting arrangement as claimed in claim 10, wherein said output means is coupled in common to the primary winding circuit paths of a plurality of pulse transformers, each of the pulse transformers having its secondary winding connected in series with an individual inductor to an individual gate, the gates being enabled by different address first parts, the secondary windings of the pulse transformers being connected to the first sides of the status indicating switching means of different pluralities of peripheral units forming groups.

* * * * *